United States Patent

[11] 3,567,871

[72] Inventor Charles F. Walter
4124 46th Ave. S., Minneapolis, Minn. 55406
[21] Appl. No. 775,847
[22] Filed Nov. 14, 1968
[45] Patented Mar. 2, 1971

[54] SHOULDER SUPPORT AND HAND GRIP FOR TELEPHONE
4 Claims, 5 Drawing Figs.

[52] U.S. Cl. .......... 179/157
[51] Int. Cl. .......... H04m 1/04
[50] Field of Search .......... 179/157

[56] References Cited

UNITED STATES PATENTS

| | | | |
|---|---|---|---|
| 2,382,125 | 8/1945 | Balkins | 179/157 |
| 2,493,954 | 1/1950 | Epstein | 179/157 |

*Primary Examiner*—William C. Cooper
*Attorney*—Williamson, Palmatier & Bains

ABSTRACT: A telephone handset support block having a concave, shoulder-engaging pocket with an inclined surface which serves to tilt the handset receiver and transmitter portions towards the user at a convenient angle. A slightly convex surface on a base portion of the support block serves as a hand grip by means of which a telephone handset of the type having a built-in dial may be balanced and supported when dialing.

PATENTED MAR 2 1971 3,567,871

INVENTOR.
CHARLES F. WALTER
BY Williamson, Palmatier & Bains
ATTORNEYS

SHOULDER SUPPORT AND HAND GRIP FOR TELEPHONE

BRIEF SUMMARY OF THE INVENTION

The telephone support of this invention is particularly characterized by a contoured block having an inclined concavity adapted to engage the shoulder of the user in such a way as to tilt the telephone handset to which the block is attached towards the face of the user and thereby position the telephone receiver and transmitter conveniently close to the mouth and ear of the user.

A particularly advantageous feature of my improved telephone support resides in the provision of a base portion having a slightly convex outer surface contoured to fit snugly into the palm of the user's hand and functioning as a grip by means of which a handset having a built-in dial may be supported when dialing or when positioning the support block on the user's shoulder.

As a further beneficial aspect of my invention, I utilize pressure-sensitive adhesive pads to secure a concave inner face of the support block to the back wall of a telephone handset, the adhesive pads being resilient so as to provide a cushioning effect between the handset and the conforming, contoured face of the support block when the handset-support block assembly is cradled by the user between his head and shoulder.

These and other objects and advantages of my invention will become readily apparent as the following description is read in conjunction with the accompanying drawings, wherein like reference numerals have been used to designate like elements throughout the several views.

DESCRIPTION OF THE PREFERRED EMBODIMENT

Figures 2, 4:
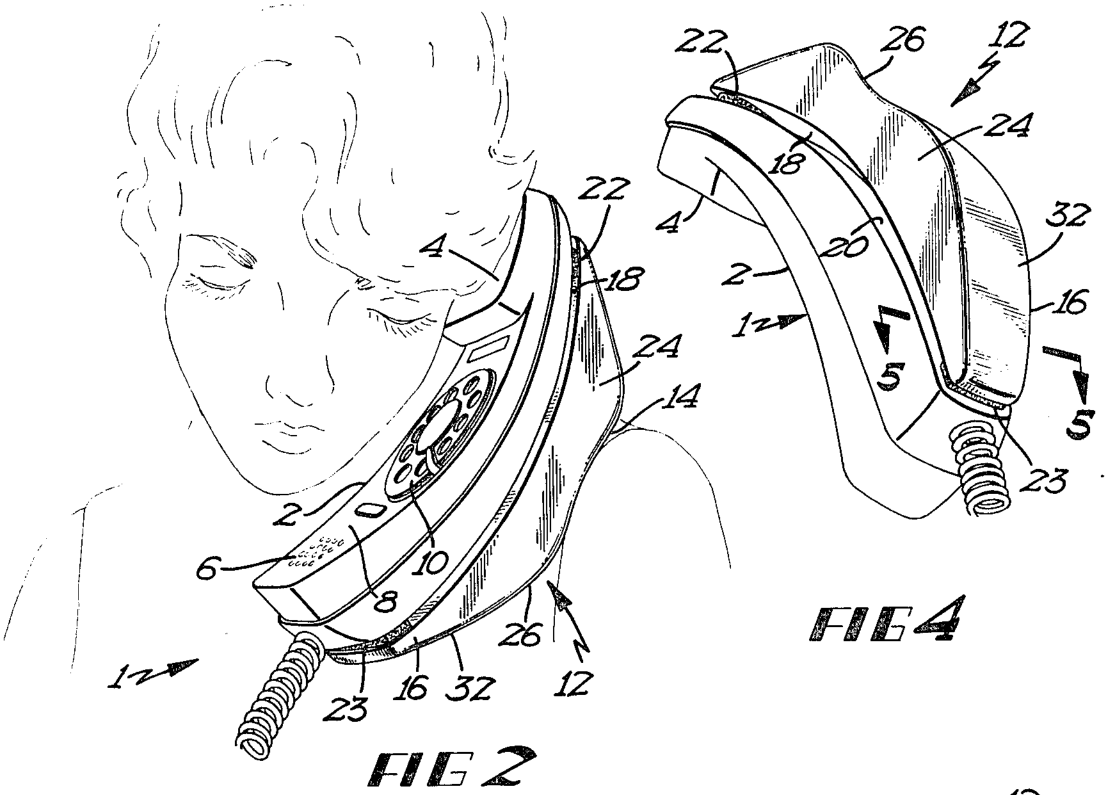
FIG. 2 is a front, perspective view of the telephone support block assembly showing the manner in which the contoured support block rests on the shoulder of the user.
FIG. 4 is a perspective view showing the opposite side of the support block from that shown in FIG. 1
Figure 3:
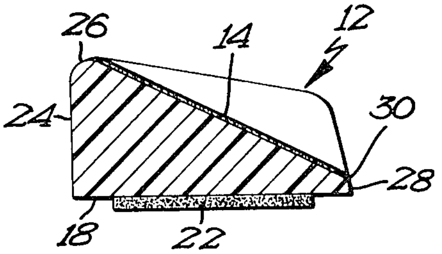
FIG. 3 is a transverse section view taken along lines 3–3 of FIG. 1.
Figure 1:
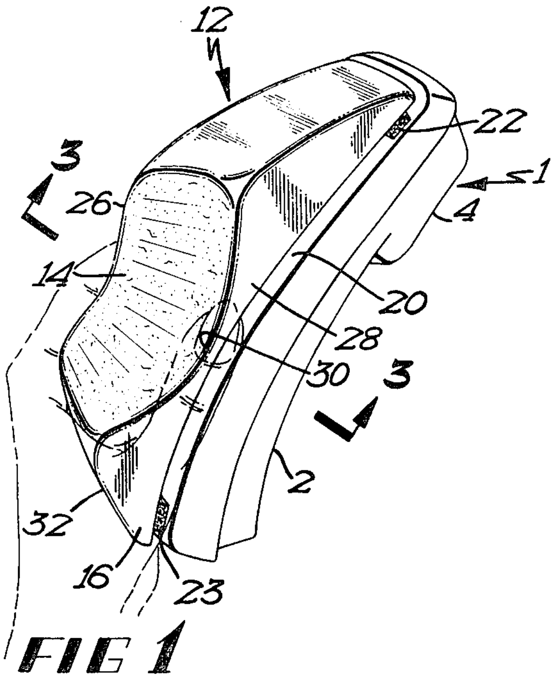
FIG. 1 is a rear, perspective view showing the shoulder support block of this invention attached to a telephone handset.

The telephone support device of this invention has been particularly designed with a view towards providing a shoulder rest and support member for telephone handsets of the type having a built-in dial wheel. FIGS. 1, 2 and 4 show such a telephone handset which is designated generally by reference numeral 1. Handset 1 is comprised of an elongated shank portion 2 having a receiver earpiece 4 and transmitter 6 at opposite ends thereof. Built in to a recess in front wall 8 of handpiece 1 is a dial wheel 10. It will be appreciated that the long, thin configuration of handset 1 makes it particularly unwieldy and difficult for a person to grip and balance with one hand while operating dial 10 with his other hand. Also, it would be especially desirable to provide some means for supporting handset 1 on a person's shoulder while he is carrying on a two-way telephone conversation so that both of his hands are free to take notes, handle papers and attend to other manual functions. My improved support block designated generally by reference numeral 12 has a unique contour which permits it to advantageously serve the dual functions of a shoulder rest and a hand grip for handset 1. Support device 12 preferably takes the form of an elongated block which overlies substantially the entire length of shank portion 2 of handset 1 in the manner indicated in FIGS. 1, 2 and 4. Aside from providing an attractive and stylish handset support assembly, the elongated shape of support block 12 is important from a functional and structural standpoint in that it provides sufficient surface area for both a shoulder-engaging pocket 14 and a hand grip 16.

Support block 12 is formed with an inner, longitudinally concave surface 18 which is contoured to conform to the arcuate shape of shank portion 2 of handset 1. It will be seen that concave surface 18 extends lengthwise over arcuate back wall 20 of handset 1; and for the purpose of securing support block 12 to handset 1, I utilize adhesive fasteners 22 and 23 which have pressure-sensitive adhesive surfaces on opposite faces thereof and serve to hold concave surface 18 to back wall 20 of handset 1. Adhesive fasteners 22 and 23 are preferably resilient pads which provide a desirable cushioning effect when the handset and support block assembly 1, 12 is cradled by the user and pressed between his head and shoulder in the manner shown in FIG. 2.

As may be noted with respect to FIGS. 1 through 4, the body portion of support block 12 within which concave pocket 14 is formed has a relatively thick wall section 24 at one edge 26 thereof and a wall section 28 of substantially reduced thickness at the opposite longitudinal edge 30. By thus varying the thickness of sidewalls 24 and 28, concave pocket 14 is made to taper or incline inwardly and downwardly from outer longitudinal edge 26 towards inner, longitudinal edge 30, as appears most clearly in FIGS. 1 and 3. Referring now to FIG. 2, it will be seen that when concave pocket 14 of support block 12 is positioned on the user's shoulder with longitudinal edge 26 and thick wall section 24 disposed outermost from the user's head and with relatively thin, inner wall section 28 and edge 30 abutting against the inside of the user's shoulder, handset 1 will be tilted or cocked at an angle. The tilted position in which the handset 1 is thus supported by block 12 serves to position receiver 4 and transmitter 6 at a convenient angle facing towards the mouth and ear of the user in close proximity thereto.

Figure 5:
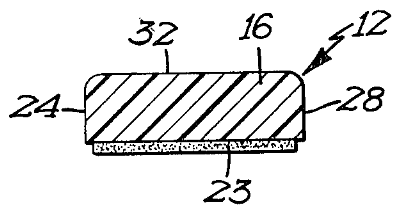
FIG. 5 is a transverse section view taken along lines 5–5 of FIG. 4.

In order to facilitate the handling of the combined handset 1 and support block 12, base portion 16 is provided at the lower end of support block 12 opposite the transmitter-containing lower end of handset 1. In order to facilitate the gripping of base portion 16, it is provided with a slightly convex outer surface 32 which fits snugly into the palm of the user's hand. The configuration of surface 32 appears most clearly in FIGS. 1, 4 and 5. By grasping base dialing with surface 32 resting in the palm of one's hand in the manner indicated in phantom lines in FIG. 1, one is able to firmly support and balance the upwardly extending handset 1 when dialing with integral wheel 10. The location of base grip 16 adjacent the lower end of handset 1 makes it particularly easy to hold handset 1 in an upwardly extending position with dial 10 facing upwardly and outwardly towards the user.

Support block 12 could be formed from various materials such as rubber, plastic or metal. It is preferably injection molded from the same plastic material from which handset 1 is formed. I have also found it desirable to provide a roughened texture on the surface of shoulder-engaging pocket 14 to assist in holding support block 12 on the user's shoulder.

On the basis of the foregoing description, it will be readily apparent that inclined concavity 14 and base portion 16 with slightly concave surface 32 render my improved support block 12 particularly effective in supporting a handset 1 in the desired position on the user's shoulder, and in providing for the necessary gripping and supporting of the combined handset 1 and support block 12 when using dial wheel 10. Although support block 12 has been illustrated and described in combination with a telephone handset of the type having an integral dial wheel, I contemplate that inclined, concave pocket 14 could be utilized with equally beneficial results on a standard handset designed for use with a base cradle on which a separate dial is mounted.

I claim:

1. A shoulder support for a telephone handset having a receiver and transmitter at opposite ends of an elongated, connecting shank, comprising:

an elongated support block adapted to be mounted on the backwall of said handset shank; and a concave, shoulder-engaging pocket formed in the outer surface of said block, the portion of said block within which said pocket is formed having a relatively thick wall section at one longitudinal edge thereof and a wall section of substantially reduced thickness at the opposite longitudinal edge thereof, and said concave, shoulder-engaging pocket inclining inwardly and downwardly from said one edge to said opposite edge, whereby the positioning of said inclined pocket on the user's shoulder with said one edge disposed outermost with respect to the user's head will cause said handset to be tilted towards the user's head with said receiver and transmitter in convenient juxtaposition to the user's ear and mouth respectively.

2. A telephone shoulder support as defined in claim 1 wherein:

said support block has a longitudinally concave inner surface contoured to conform to the arcuate shape of the shank portion of a telephone handset of the type having a dial built in to the front wall of said shank as an integral portion of said handset, said concave inner surface being attached to said arcuate shank and overlying substantially the entire length of said back wall thereof; and further including a base portion of said block having a slightly convex outer surface adapted to be grasped in the palm of the user's hand to support and balance said telephone handset when dialing and when moving the support block into position on the user's shoulder, said base portion being located adjacent the transmitter of said handset.

3. A telephone shoulder support as defined in claim 1 wherein said elongated support block has an inner, concave surface extending longitudinally thereof and contoured to conform to the arcuate shape of said handset shank, said inner, concave surface of said support block overlying substantially the entire length of said back wall of said arcuate shank and being secured thereto by adhesive fasteners.

4. A telephone shoulder support and handset assembly as defined in claim 3 wherein said adhesive fasteners are in the form of resilient pads having pressure-sensitive adhesive surfaces on opposite faces thereof in contact with said backwall of said handset shank and said inner, concave surface of said shoulder support.